Patented Oct. 6, 1931

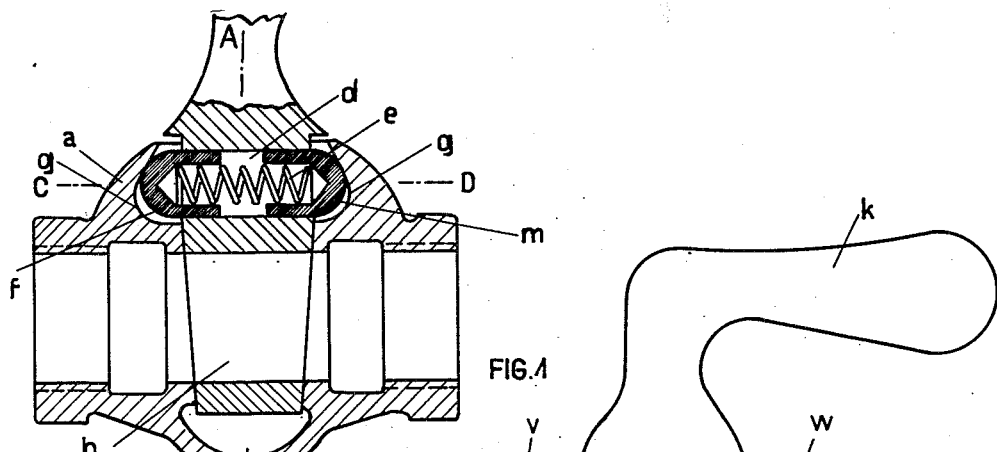
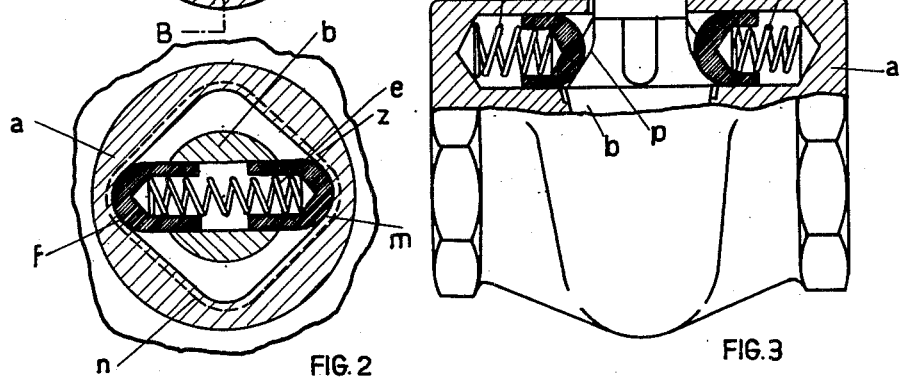
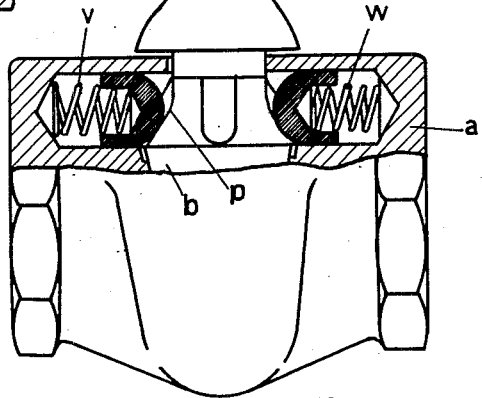
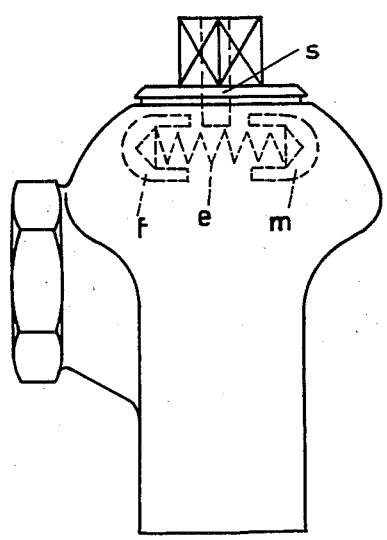
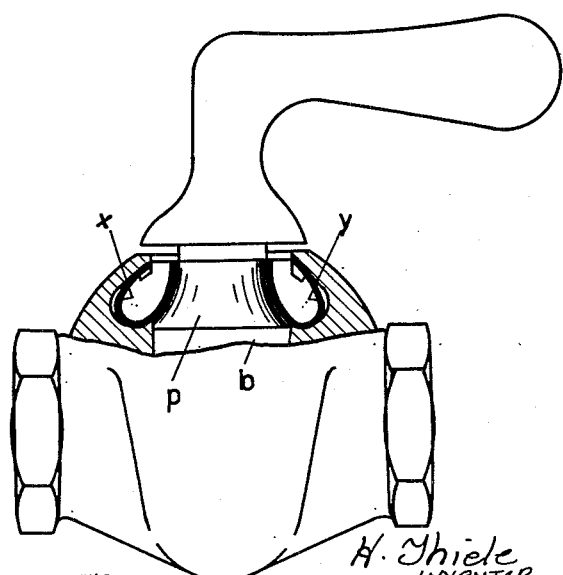

1,826,330

UNITED STATES PATENT OFFICE

HANS THIELE, OF BERLIN-FRIEDENAU, GERMANY

COCK

Application filed February 25, 1930, Serial No. 431,289, and in Germany March 5, 1929.

This invention relates to a cock suited for general use but being particularly intended for use in connection with gas conduits or pipes for closing or opening them. Securing the plug or the equivalent member of the cock in place and tightening it, is, in the known designs of cocks for the purpose stated and for similar purposes effected by means of, or with the aid of, a screw or a nut or a compressive spring or a tensile spring or a combination or plurality of such members, the direction of action of which corresponds always with the longitudinal direction of the axis of turning of the plug or the equivalent member. This manner of securing the plug in place, and of tightening it, suffers from the drawbacks that either the tightening is insufficient or the plug tends to get jammed fast in its casing, or both detrimental consequences are experienced.

Now, there is, or are used, according to this invention, a spring, or springs, arranged transversely with respect to the axis of turning of the plug and co-operating with inclined faces provided either in a chamber or cavity provided in the casing, or at the plug neck, the arrangement being in either case such that a component force results tending to press the plug axially upon its set. There may be used flat springs of about U-shape or helical springs of cylindrical shape, and there may be used one spring or two springs, these springs being preferably provided with caps co-operating with certain surfaces or certain shapes, all as more fully described hereinafter.

The invention is illustrated diagrammatically and by way of example on the accompanying drawings on which Figure 1 is a vertical axial section through a cock designed according to this invention; Figure 2 is a horizontal section in the plane C—D of Fig. 1; Figure 3 is partly a side-view and partly an axial vertical section of a modification; Figure 4 is a representation similar to Fig. 3 and showing another modification; and Figure 5 is a side-view of a cock designed chiefly like that of Figs. 1 and 2, but having not a through-passage, but an angular one.

Referring to Figs. 1 and 2, $a$ is the casing and $b$ the plug of a gas cock. A—B denotes the axis of turning of said plug. This latter has in its upper part a transverse bore $d$ in which is located a compressive spring $e$. The ends of this spring engage two caps $f$ and $m$ which are shiftable in the bore $d$. They are pressed outwardly by the spring and this latter is compressed when the caps are moved inwardly. The heads of the caps are located in a chamber or cavity $z$ of the casing. This cavity is practically square in horizontal section (Fig. 2), but the corners are rounded so that the caps can pass easily from one pair of these rounded corners to and into the other pair, viz. when the plug is turned by means of the grip $k$. In the position shown in Fig. 2 the cock is open, and when the plug is turned through 90° it is closed, the caps engaging then the other pair of the rounded corners of the cavity $z$. In both positions the plug is prevented from spontaneous turning, as will be clear without a more detailed explanation. The vertical walls of the chamber or cavity diverge downwardly (Fig. 1), in consequence whereof a vertical component tending to keep the plug pressed upon its seat is produced whereby the plug is kept tight.

In the modification shown in Fig. 3 there are two springs $v$ and $w$ instead of one spring, as in Figs. 1 and 2, and the caps $p$ are located between these springs and the neck of the plug, which resembles somewhat a four-sided pyramid having in each side a recess with which the caps are in engagement. There are, thus, four recesses, corresponding to the two main positions of the plug, one in which the cock is open and one in which it is closed. Owing to the four lateral faces of the plug neck diverging downwardly (like the four lateral faces of the cavity *d* in Figs. 1 and 2), the plug is depressed because the caps are pressed against said faces by the springs, and the plug is thus also in this instance kept properly tight.

In Fig. 4 the cylindrical helical springs are replaced by two practically U-shaped flat springs *x* and *y*, the inner legs of which bear upon the opposite faces of the plug neck. The co-operation of the members concerned and the effect thereof is the same as in the other constructional forms.

In the constructional form shown in Fig. 5 the arrangement and combination of the members concerned is the same as in Figs. 1 and 2, the only material differences being, that, firstly, the casing is designed for angular passage of the gas or other fluid and the plug channel is, thus, closed at one of its ends and open at its bottom, as is known with plugs for angular passage of the fluid concerned, and secondly, instead of the grip *k* (Figs. 1, 3 and 4) a square head adapted to receive a socket wrench or the like is secured to the plug by means of a pin *s*.

I claim:

1. A gas cock, comprising, in combination with the plug and its neck which is located above the passage of the plug, a casing having in its top a chamber surrounding said plug neck, and elastically yieldable means arranged in said chamber transversely with respect to the axis of turning of the plug, the walls co-operating with said means being so shaped that an axially acting pressure tending to press the plug upon its seat is produced.

2. A cock suited particularly for gas conduits and pipes, comprising, in combination, with the plug and its neck which is located above the passage of the plug, a casing having in its top a chamber surrounding said plug neck, and transversely arranged springs located in said chamber and co-operating with faces of such a shape that an axially acting pressure tending to press the plug upon its seat is produced.

3. A cock, especially a gas cock, comprising, in combination with the plug and its neck which is located above the passage of the plug, a casing having in its top a chamber surrounding said plug neck, transversely arranged springs located in said chamber and co-operating with faces of such a shape that an axially acting pressure tending to press the plug upon its seat is attained, and caps placed upon those ends of said springs which co-operate with said faces.

4. A cock, especially for use in connection with gas conduits and pipes, comprising, in combination with the plug and its neck which is located above the passage of the plug, a casing having in its top a chamber surrounding said plug neck, a transversely arranged spring located in a transverse bore in the plug neck, and caps placed upon the ends of said spring, said caps co-operating with faces of such a shape that an axially acting pressure tending to press the plug upon its seat is attained, the said caps engaging the plug neck bore and being guided therein, substantially as set forth.

In testimony whereof I affix my signature.

HANS THIELE.